US010427191B2

(12) United States Patent
Crichlow

(10) Patent No.: US 10,427,191 B2
(45) Date of Patent: Oct. 1, 2019

(54) DEEP GEOLOGIC DISPOSAL OF NUCLEAR WASTE

(71) Applicant: Henry Crichlow, Norman, OK (US)

(72) Inventor: Henry Crichlow, Norman, OK (US)

( * ) Notice: Subject to any disclaimer, the term of this patent is extended or adjusted under 35 U.S.C. 154(b) by 193 days.

(21) Appl. No.: 15/480,504

(22) Filed: Apr. 6, 2017

(65) Prior Publication Data

US 2018/0290188 A1 Oct. 11, 2018

(51) Int. Cl.
*G21F 9/30* (2006.01)
*G21F 9/34* (2006.01)
*B09B 1/00* (2006.01)
*G21F 5/005* (2006.01)

(52) U.S. Cl.
CPC .............. *B09B 1/008* (2013.01); *G21F 5/005* (2013.01); *G21F 9/301* (2013.01); *G21F 9/34* (2013.01)

(58) Field of Classification Search
CPC . B09B 1/008; G21F 9/34; G21F 9/301; G21F 5/005
See application file for complete search history.

(56) References Cited

U.S. PATENT DOCUMENTS

| 3,948,575 | A | * | 4/1976 | Rosser | E21B 17/1078 |
| | | | | | 175/325.2 |
| 4,320,028 | A | | 3/1982 | Leuchtag | |
| 4,337,167 | A | | 6/1982 | Bird | |
| 5,314,264 | A | * | 5/1994 | Danko | G21F 9/34 |
| | | | | | 405/129.35 |
| 5,387,741 | A | * | 2/1995 | Shuttle | B09B 1/008 |
| | | | | | 405/129.57 |
| 5,835,548 | A | | 10/1998 | Lindgren | |
| 5,832,392 | A | | 11/1998 | Forsberg | |
| 5,850,614 | A | | 12/1998 | Crichlow | |
| 5,863,283 | A | * | 1/1999 | Gardes | B09B 1/008 |
| | | | | | 166/290 |
| 6,238,138 | B1 | | 5/2001 | Crichlow | |
| 6,889,108 | B2 | | 5/2005 | Tanaka | |
| 6,925,138 | B2 | * | 8/2005 | Nakamaru | G21C 1/084 |
| | | | | | 376/171 |
| 7,781,637 | B2 | | 8/2010 | Russell | |
| 8,135,107 | B2 | * | 3/2012 | Singh | G21F 5/005 |
| | | | | | 376/272 |
| 8,933,289 | B2 | | 1/2015 | Crichlow | |
| 10,002,683 | B2 | * | 6/2018 | Muller | B09B 1/00 |
| 10,115,490 | B1 | * | 10/2018 | Downey | G21F 9/34 |
| 2010/0105975 | A1 | * | 4/2010 | Baird | E21B 41/0057 |
| | | | | | 588/16 |
| 2013/0112408 | A1 | | 5/2013 | Oxtoby | |
| 2018/0345336 | A1 | * | 12/2018 | Muller | B09B 1/006 |

* cited by examiner

*Primary Examiner* — Michael C Zarroli
(74) *Attorney, Agent, or Firm* — Eric Kelly

(57) ABSTRACT

Systems and methods for long term disposal of high level nuclear waste in deep geologic formations are described. Such systems and method may include largely intact spent nuclear fuel rods in a disassembled form that may be placed into waste-capsules (e.g., carrier tubes); which may then be placed into various well boreholes. Example embodiments may provide waste-capsules capable of containing and disposing of waste generated from spent nuclear fuel, including means for harvesting the nuclear waste from cooling pools and operationally processing the waste fuel assemblies for inclusion in the waste-capsules with various engineered barriers; along with storage in horizontal well boreholes drilled into closed deep geologic formations.

18 Claims, 13 Drawing Sheets

DEEP GEOLOGIC DISPOSAL OF NUCLEAR WASTE

CROSS REFERENCE TO RELATED PATENT APPLICATIONS

This patent application is related to previous patents by the inventor related to the disposal of nuclear waste in deep underground formations. These patents are:
U.S. Pat. No. 5,850,614;
U.S. Pat. No. 6,238,138; and
U.S. Pat. No. 8,933,289;
the disclosures of which are all incorporated herein by reference in their entirety.

TECHNICAL FIELD OF THE INVENTION

The present invention relates generally to disposing of nuclear waste and more particularly, to: (a) the operations of nuclear waste disposal; and (b) utilization of specialized capsules or containers for nuclear waste which may be sequestered in lateral wellbores drilled into deep geologic formations, such that, the nuclear waste is disposed of safely, efficiently, economically and in addition, if required, may be retrieved for various reasons.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Today there is a massive quantity of nuclear waste accumulating across the world. In the US alone there are more than 70,000 metric tons (MT) of high-level solid waste (HLW) being stored in cooling pools and in concrete casks on the surface. This surface operation is very costly typically costing hundreds of millions of dollars annually. The HLW is generally called spent nuclear fuel (SNF) and consists of thousands of nuclear fuel assemblies which have been removed from operating nuclear power plants. These fuel assemblies are highly radioactive and also thermally active and continue to generate sensible heat which must be safely removed by maintaining these assemblies in cooling tanks at the onsite surface storage site. There are approximately 80,000 individual fuel assemblies being stored today in the US and about 15,000 MT being added annually. There is a significant need for new mechanisms and processes to safely get rid of the surface storage of this radioactive waste and to sequester this SNF waste in a safe manner. In this application HLW and SNF are used interchangeably to describe the solid nuclear waste product.

In this application the word capsule and canister may be used interchangeably with the same meaning; and HLW and SNF describing nuclear waste may also be used interchangeably herein.

Current scientific knowledge teaches that the conversion of nuclear waste to an acceptable waste form requires either, (a) that the wastes be separated from the other constituents and processed separately, or (b) that the wastes together with the other constituents be processed together. Both processes present a variety of technical challenges. Due to the radioactivity and toxicity of the wastes, separation can be both hazardous, expensive and prone to human-induced accidental problems.

To date, and based on the prior art, in order to provide a satisfactory and economical final disposal of these wastes, it is desirable that the wastes be processed into a final form without the hazardous and expensive step of removing the other constituents. It has been understood that the waste in this final form prevents removal of the fissile constituents of the wastes and further immobilizes the waste to prevent degradation and transport of the waste by environmental mechanisms.

Several methods for providing an acceptable final form for waste are known in the art, including:

(a) Vitrification to produce borosilicate glasses having waste constituents bound within the glasses has been shown as an effective method for treatment of low volumes of HLW. In the vitrification process, wastes are mixed with glass-forming additives and converted into an amorphous glassy form by high temperature melting and cooling. There are several inherent technical drawbacks of vitrification. A further drawback of vitrification arises due to the low solubility of many of the waste components of interest in glass which prohibits large concentrations of the waste components in the final glass form. This low solubility greatly increases the required volume of the final waste form for a given volume of radioactive waste components of interest, thus unfortunately the waste volume "grows." This makes the overall nuclear waste product even larger than the original thus requiring more storage and costs.

(b) Ceramification produces another form of nuclear waste. It can be accomplished by the incorporation of waste components of interest into a synthetic rock (synroc) which is a ceramic material. The synroc process has been fully developed and as commercialized in Australia (ANSTO) produces a crystalline final waste form and involves several complex expensive steps involving high temperatures and pressures utilized to successfully create a suitable final waste form.

The cost associated with these two primary methodologies is prohibitive. Published information from the US Hanford Nuclear facility which is designed for vitrification operations has a projected cost level of $16 Billion.

Published information from the ANSTO facility which is designed for ceramification operations has a projected cost of hundreds of millions of dollars. Commercial revenues are expected to pay for development. Both processes listed herein (e.g., vitrification and/or ceramification) increases a volume of waste product to be stored. Thus, use of these processes may be counter-intuitive with a goal of minimizing an amount of nuclear waste. That is, use of these processes creates even more nuclear waste that needs to be safely handled and stored.

Based on the inherent shortcomings of the prior art, there exists a critical need for an effective, economical method for developing and utilizing an acceptable nuclear waste process for nuclear waste products; a process that precludes the need for all the expensive, time-consuming and dangerous intermediate operations that are currently being used or contemplated to render the nuclear waste in a form that eventually, still has to be buried in deep underground repositories. An approach is needed that minimizes these intermediate steps. To solve the above-described problems, the present invention provides a system and method to dispose of the nuclear waste currently accumulating on the surface.

The novel approach as taught in the application provides a methodology wherein the waste disposal operations go directly from the existing fuel assembly rod cooling ponds to the underground disposal repository with minimal additional effort and without the afore-listed intermediary steps of vitrification and ceramification.

It is to these ends that the present invention has been developed.

BRIEF SUMMARY OF THE INVENTION

To minimize the limitations in the prior art, and to minimize other limitations that will be apparent upon reading and understanding the present specification, the present invention describes systems and methods for storage of nuclear waste into closed and deep geological formations, using waste-capsules and largely intact bundles of fuels rods.

The present invention is concerned with disposing of nuclear waste and, more specifically, to a method and system of disposing of encapsulated nuclear waste in deep underground closed rock formations using multilateral horizontal boreholes connected to the surface by a vertical wellbore. More specifically, the invention describes methods and systems in which a novel capsule system and internment methodology are illustrated to provide a safe long-term nuclear waste repository.

A primary object of the present invention is to provide a method of disposing of nuclear waste in deep underground rock formations.

An additional object of the present invention is to provide a method of disposing of nuclear waste in underground rock formations which will provide protection in case of rupturing or leaking of a canister in which such waste may be stored. As noted, both processes listed herein (e.g., vitrification and/or ceramification) increases the volume of waste product to be stored. Thus, use of these processes may be counter-intuitive with a goal of minimizing an amount of nuclear waste. That is, use of these processes creates even more nuclear waste that needs to be safely handled and stored.

It is possible to provide a method of disposing of nuclear waste in underground rock formations which will bury the waste in horizontally extending lateral boreholes positioned well below the earth's surface and thus very remote from the ecosphere.

In some embodiments, providing a waste-capsule in which the nuclear waste is further protected by a series of engineering and natural barriers may be utilized.

It is possible to provide a method of disposing of nuclear waste in deep closed underground rock formations wherein the design of the capsule provides several novel features which allow:

(a) personnel safety during surface transport of HLW;
(b) personnel safety on the surface during drilling and disposal working operations;
(c) economic and operational efficiencies in post-processing after waste accumulation at the power plants and prior to preparation of SNF for sequestering underground;
(d) long term corrosion resistance while stored underground;
(e) long term radionuclide protection to the environment;
(f) retrievability of the capsule and thus the HLW after emplacement even under severe adverse conditions;
(g) an additional object of the present invention is to provide a method in which the capsules can be disposed underground in a manner such that the waste generated heat load is optimally distributed such that the process remains stable over time and the heat load is below permissible limits; and/or
(h) an implementation of non-waste-bearing inline spacers to allow control of generated heat load in the waste repository.

A method of disposing nuclear waste in underground rock formations is disclosed by the present invention. The method includes a step of selecting an area of land having a rock formation positioned there below. The rock formation must be of a depth able to prevent radioactive material placed therein from reaching the surface over geologic times and must be at least a predetermined distance from active water sources. In some embodiments, the method may further include drilling a vertical wellbore from about 5,000 feet to about 30,000 feet deep from the surface of the selected area which extends into the underground rock formation. In some embodiments, a diameter of the vertical wellbore may be between about 10 inches and about 36 inches, plus or minus one inch.

The selected geologic formations should also be structurally closed and comprise sufficient distinct geologic layers of specific petrophysical properties such that the repository is stratigraphically impermeable to fluid migration.

In some embodiments, at least one primary horizontal lateral wellbore of length varying from 500 feet to 20,000 feet, may be drilled out from the vertical wellbore whereby the surface of the horizontal lateral is defined by the underground rock formation. In some embodiments, a diameter of the lateral well bores may vary from about 5 inches to about 30 inches, plus or minus one inch. Secondary laterals can be drilled off the initial primary lateral as needed to increase the total volumetric capacity of the disposal system. A steel casing is placed within the horizontal lateral and cemented in place by circulating cement in the annular space between the steel casing and the wall of the wellbore. Nuclear waste to be stored within the lateral is placed in a canister or capsule and the encapsulated nuclear waste is positioned within the primary horizontal lateral as described herein. The capsules are then sealed in place with appropriate means.

In some embodiments, a method may provide an operational method for fabricating at least one nuclear waste capsule. In this operational method the recommended tasks involved provide a more efficient methodology to allow safer, more economical and long lasting disposal of the nuclear waste in the deep underground repositories.

In some embodiments, a very significant existing consideration be addressed in long-term nuclear waste disposal process. It is the eventual degradation of the physical integrity of the well bore system components. Some mechanisms are needed to minimize the degradation. A long-lived technology system is required to guarantee within technical certainty that the HLW can be contained adjacent and within the repository zone.

In some embodiments, a means may be utilized that may provide for very long-lived protection from degradation and migration of material away from the nuclear waste material. Stratigraphic and current structural geological analysis of underground oil formations which have historically produced heavy oil and other hydrocarbons indicate that tar-like deposits have existed for millions of years and have remained essentially unchanged and intact over time. In many cases the tar-like deposits actually formed an impermeable seal that prevented fluid flow across the rock matrix due to physical and chemical changes in the rock media.

Bitumen-like products and some petroleum-based products possess the qualities that make them capable of being utilized for low temperature sealing situations in the disposal of nuclear wastes. Other more temperature resistant chemical products are needed for higher temperature situations.

In many oil reservoirs, geologists have defined so-called "marker" beds of tar or high viscosity bitumen which are millions of years old. This geologic phenomenon illustrates the chemical stability of the hydrocarbon-based material over very long time periods, usually millions of years. This chemical stability of the tar-like material allows a selection of natural or similar synthetic hydrocarbons or hydrocarbon derivatives based materials as the long-lived high-temperature resistant layer used to surround the high-level waste material inside the capsules. This application provides for the use of such a medium in the protection of the HLW material.

The current invention teaches an improved engineered barrier system implemented in this application with the longest duration barrier, the protective medium at the innermost layer of protection. In a naturally occurring degradation process, the degradation beginning at the outermost layer in contact with the earth continues inwards into the central core of the system. The outer protective layers, outer cement, outer steel pipe, inner cement, inner steel pipe, in this application all will degrade over varying time horizons. The inner-most tar-like medium has been historically demonstrated in the geological record, to be an effective fluid and migration barrier for millions of years. In numerical terms the cement and steel may degrade in 2,000 to 10,000 years, however the tar enclosed central core shall be protected for hundreds of thousands of years.

The foregoing and other objects, advantages and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 6C includes sectional-line 7-7.

Figure 1:
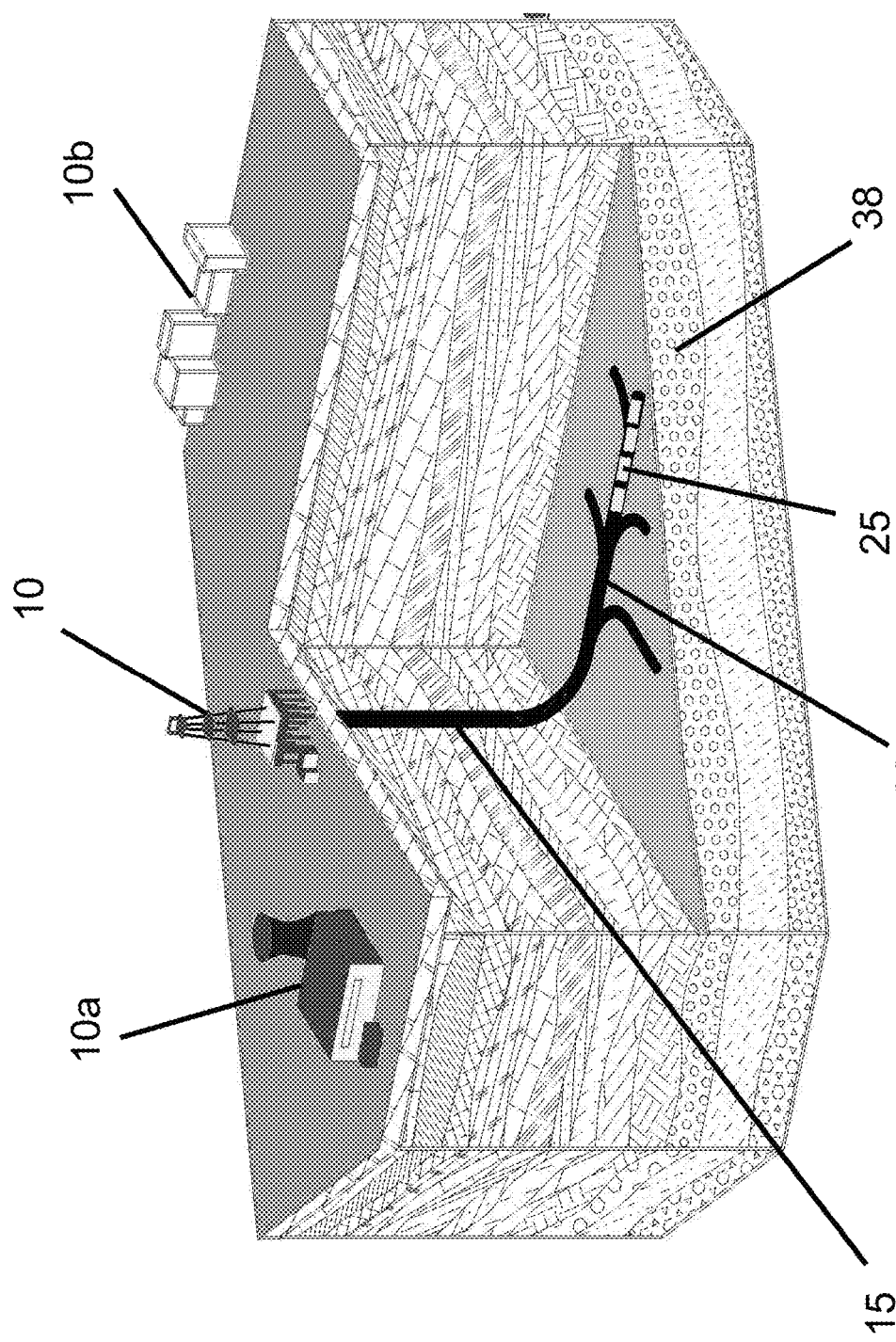
FIG. 1 shows an overview of the deep geological nuclear waste disposal system.

REFERENCE NUMERAL SCHEDULE 10 drilling-rig 10
10a nuclear power plant 10a
10b surface-storage-locations 10b
15 vertical-wellbore 15
20 primary lateral wellbore 20
20a secondary lateral wellbore 20a
25 waste-capsule 25 (for HLW or spent nuclear fuel)
30a cement 30a (between inner and outer pipes)
30b cement 30b (between outer pipe and formation)
31 outer pipe 31
32 initial lateral borehole 32
33 inner pipe 33
33a mechanical plug 33a
34 carrier tube 34
35 protective-medium 35
36 fuel rod assembly 36
36a fuel-rods-bundle 36a
36b dividing-plane 36b (for disassembly of fuel rod assembly core)
36c nuclear waste core 36c
37a centralizer 37a (for inner pipe)
37b centralizer 37b (for outer pipe)

38 deep-geological-formation 38 (for nuclear waste disposal)
39 support 39 (for fuel nuclear waste core)
40 pipe-coupling 40
42 valve element 42
44 non-waste-bearing-spacer 44
301 step of minimal to no preprocessing prior to storage 301
302 step of vitrification preprocessing prior to storage 302
303 step of ceramification preprocessing prior to storage 303
800 method of handling nuclear waste 800
801 status of fuel rod assembly in surface storage 801
803 step of receiving fuel rod assembly from surface storage 803
805 step of disassembling fuel rod assembly 805
807 step of dissembling using dividing-planes 807
809 step of inserting nuclear waste core into carrier tube 809
811 step of supporting nuclear waste core 811
813 step of injecting protective-medium 813
815 step of sealing carrier tube 815
817 step of installing spacers between carrier tubes 817
819 step of joining carrier tubes via pipe couplings 819
821 step of inserting sealed carrier tubes into inner pipes into boreholes 821
823 step of finishing inserting sealed carrier tubes into inner pipes 823
825 step of drilling boreholes 825
827 step of loading outer pipes into boreholes 827
829 step of injecting cement 829
831 step of loading inner pipes into outer pipes 831
833 step of injecting cement 833
835 step of sealing boreholes 835

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

In this patent application the words "tube" and "pipe" may be used interchangeably and refer to cylindrical elements implemented in the design and installation processes.

In this patent application the word "capsule," "carrier tube," and "canister" may be used interchangeably with the same meaning; and "HLW" and "SNF" describing nuclear waste may also be used interchangeably herein.

FIG. 1 may illustrate an inclusive overview of the nuclear waste disposal system and/or process. A surface drilling-rig 10 may be apparatus that drills vertical-wellbore 15, primary lateral wellbore 20, and/or secondary lateral wellbore 20a; and into which the waste-capsule(s) 25 may be disposed of in deep-geological-formation 38. In some embodiments, deepgeological-formation 38 may be located substantially from about 5,000 feet to about 30,000 feet below a surface, plus or minus 1,000 feet. In some embodiments, deep-geological-formation 38 may have geologic properties that make storing nuclear materials relatively safe. For example, and without limiting the scope of the present invention, in some embodiments, deep-geological-formation 38 may have one or more of the following geologic properties: structural closure, stratigraphically varied, low porosity, low permeability, low water saturation, and reasonable clay content. For example, and without limiting the scope of the present invention, in some embodiments, primary lateral wellbore 20 (e.g., which may be an initial lateral borehole 32) may be located a predetermined depth of at least 10,000 feet below the surface. In some embodiments, waste-capsule 25 may store (e.g., contain) HLW (high-level solid waste) and/or SNF (spent nuclear fuel). Associated usually, but normally at distant remote locations, may be nuclear power plant 10a; and/or surface-storage-locations 10b for nuclear waste storage. In some embodiments, drilling-rig 10 may be a typical drilling rig as used in the oil-well drilling industry but with several updated modifications and features to allow safe handling of the radioactive waste (such as, HLW and/or SNF).

Figure 2:
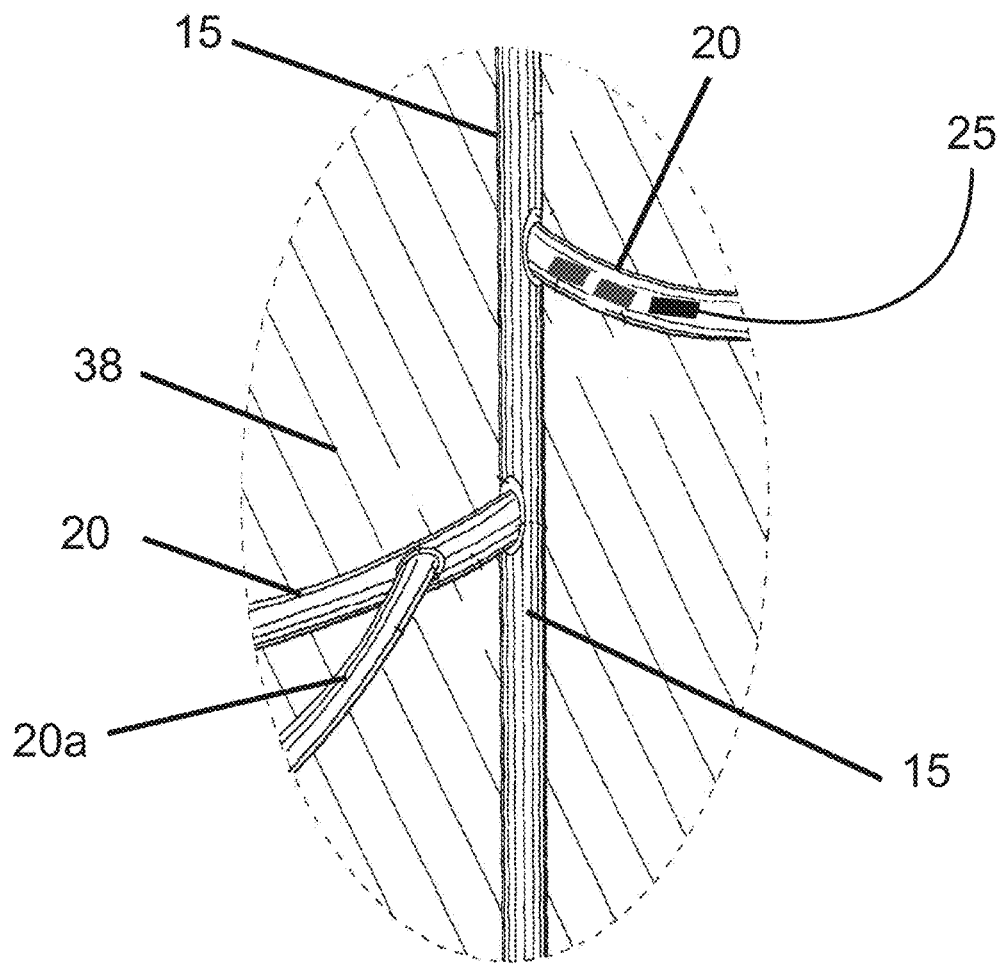
FIG. 2 shows a vertical wellbore in perspective with lateral horizontal wellbores disposed from the vertical wellbore.

FIG. 2 may illustrate primary lateral wellbore 20 relationship with respect to vertical-wellbore 15. In some embodiments, while at least some portions of vertical-wellbore 15 may be substantially vertical with respect to a surface of the earth, at least some portions of primary lateral wellbore 20 may be substantially horizontal. In some embodiments, one or more primary lateral wellbores 20 may emanate (e.g., derive) from vertical-wellbore 15. In some embodiments, one or more secondary lateral wellbores 20a may emanate (e.g., derive) from primary lateral wellbores 20. In some embodiments, one or more waste-capsules 25 may be located, placed, and/or stored in one or more of primary lateral wellbores 20, secondary lateral wellbores 20a, and/or vertical-wellbores 15. In some embodiments, drilling-rig 10 may be used to form one or more of vertical-wellbores 15, primary lateral wellbores 20, and/or secondary lateral wellbores 20a.

In some embodiments, one or more of vertical-wellbores 15, primary lateral wellbores 20, and/or secondary lateral wellbores 20a may have predetermined diameters. For example, and without limiting the scope of the present invention, in some embodiments such wellbore diameters may be selected from the range of substantially six inches to substantially 48 inches, plus or minus one inch.

In some embodiments, one or more of vertical-wellbores 15, primary lateral wellbores 20, and/or secondary lateral wellbores 20a may have predetermined lengths. For example, and without limiting the scope of the present invention, in some embodiments such lengths may be selected from the range of substantially five hundred feet to substantially twenty five thousand feet.

Figure 3:
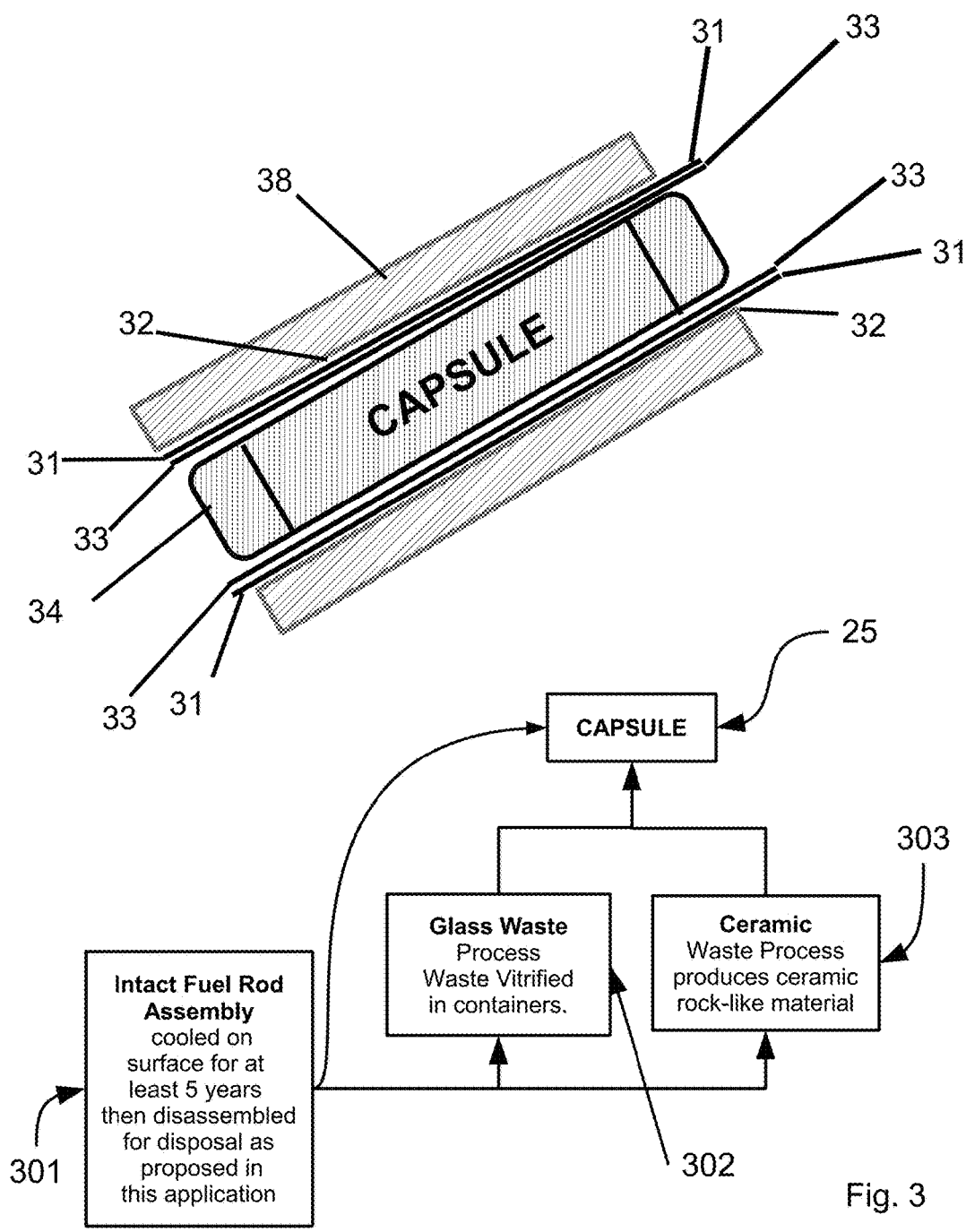
FIG. 3 is a flow chart showing the available waste pre-processing alternatives of vitrification and ceramification.

FIG. 3 illustrates two means for preprocessing the SNF for eventual disposal according embodiments of this invention. Some embodiments of the present invention may be focused on utilizing the least number of intermediary steps (e.g., preprocessing steps) in moving from nuclear power plant 10a to deep-geological-formation 38. Step 301 may be an embodiment for waste disposal as taught by this application, with minimal to no preprocessing steps. Step 302 may illustrates the vitrification pre-process in which the SNF is changed to glass like materials and then subsequently stored according to an embodiment of this invention. Step 303 may show the ceramification pre-process in which a synthetic ceramic rock "synroc" may be produced that may then be subsequently stored according to embodiments of this invention.

As shown in FIG. 3, in some embodiments, waste-capsule 25 may comprise two opposing terminal ends. In some embodiments, waste-capsule 25 may be an elongate member. In some embodiments, waste-capsule 25 may be a substantially cylindrical member. In some embodiments, waste-capsule 25 may be rigid to semi-rigid.

Figure 4:
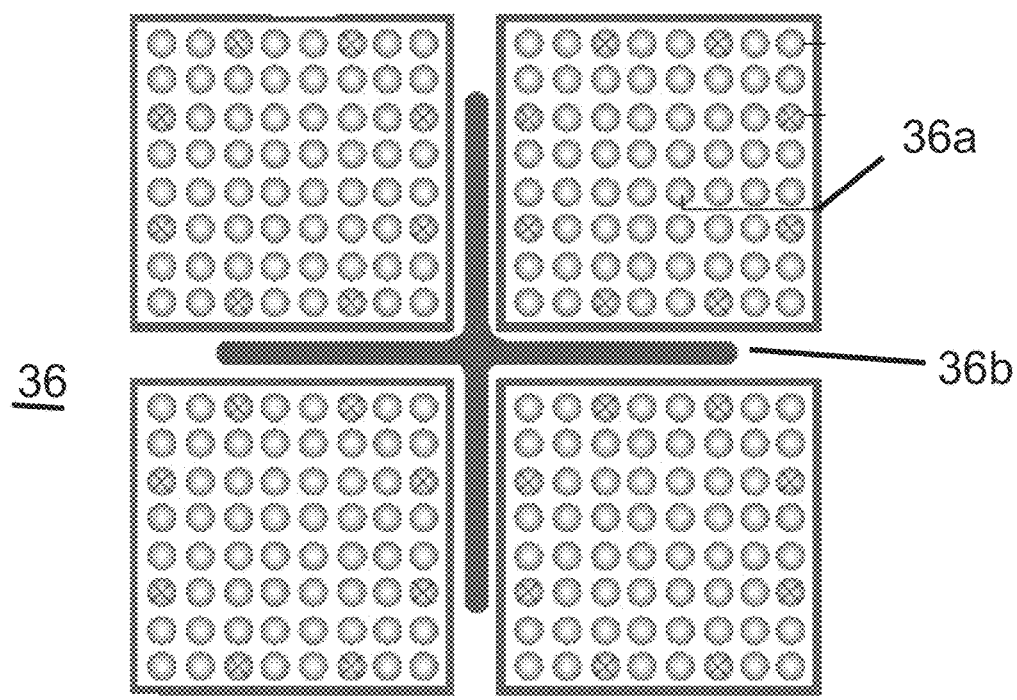
FIG. 4 is a horizontal cross-section of a typical fuel rod assembly showing the sub-assembly elements and the "division planes" along which the fuel rod assembly can be split in 4 smaller sub-assemblies or cores.

FIG. 4 may illustrate a transverse-width cross-section of a generic nuclear fuel rod assembly 36 as normally used in nuclear power plant 10a. In practice, fuel rod assembly 36 may be constructed by piecing together two or more sub-assemblies of fuel-rods-bundles 36a to form an integral sub-assembly unit in which physical division-planes 36b may be formed demarcated. For example, and without limiting the scope of the present invention, a given fuel rod assembly 36 may be formed from four such fuel-rods-bundles 36a, as shown in FIG. 4. Some embodiments of the present invention may utilize this inherent demarcation feature of fuel rod assemblies 36 to fashion a new and efficient means to safely solve waste disposal problems for SNF and/or HLW. A given fuel rod assembly 36 may be a complex apparatus comprising: metal fuel guides, channel fasteners, tie plates, expansion springs, locking tabs, metal channels, control rods, fuel rods, spacers, core plate assembly, lower tie plates, fuel support pieces, fuel pellets, end plugs, channel spacers, plenum springs, and the like.

Figure 5:
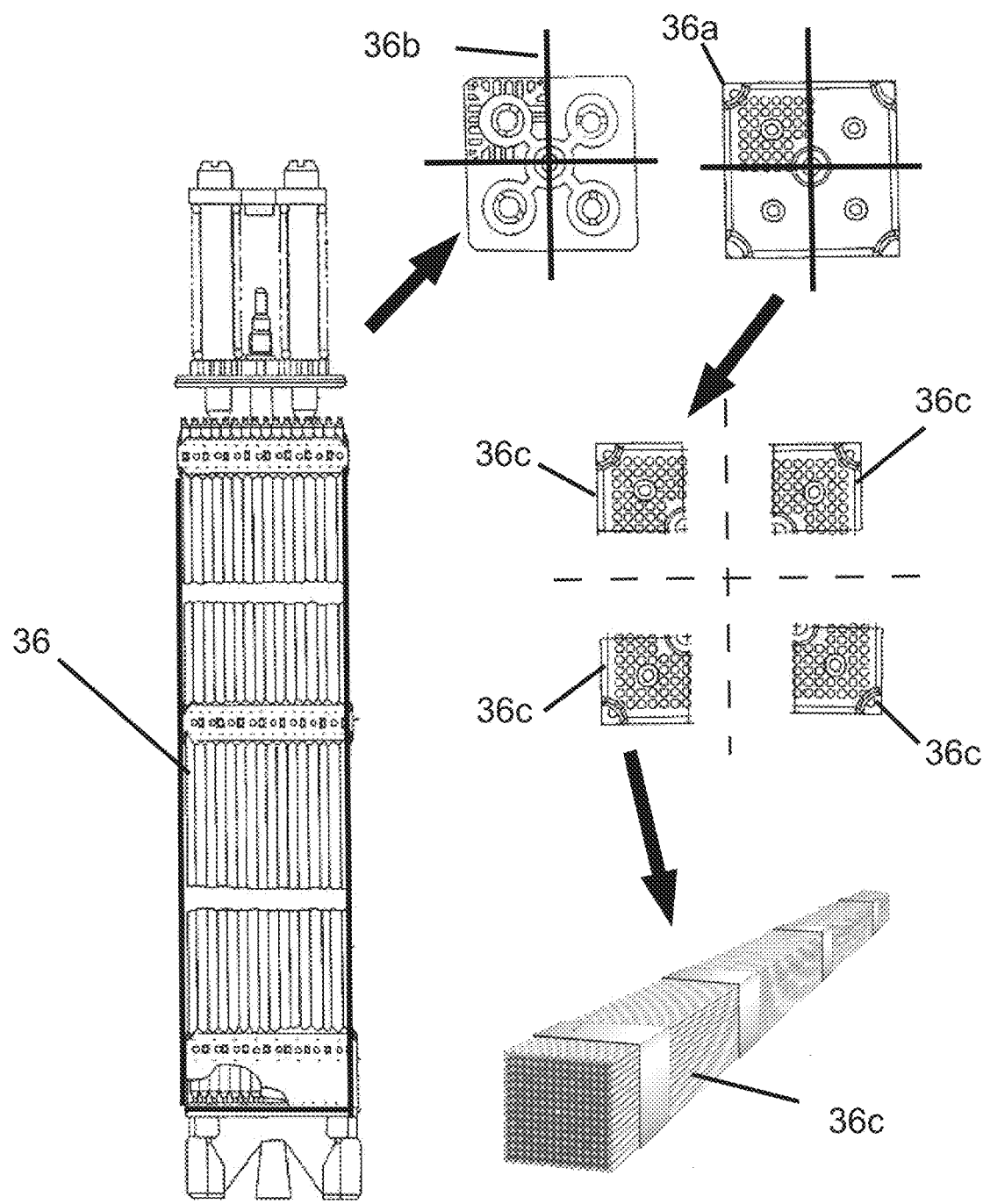
FIG. 5 is flow chart illustrating the sequence of operations in preprocessing the fuel rod assemblies harvested from the cooling pools for disposal.
Figure 8:
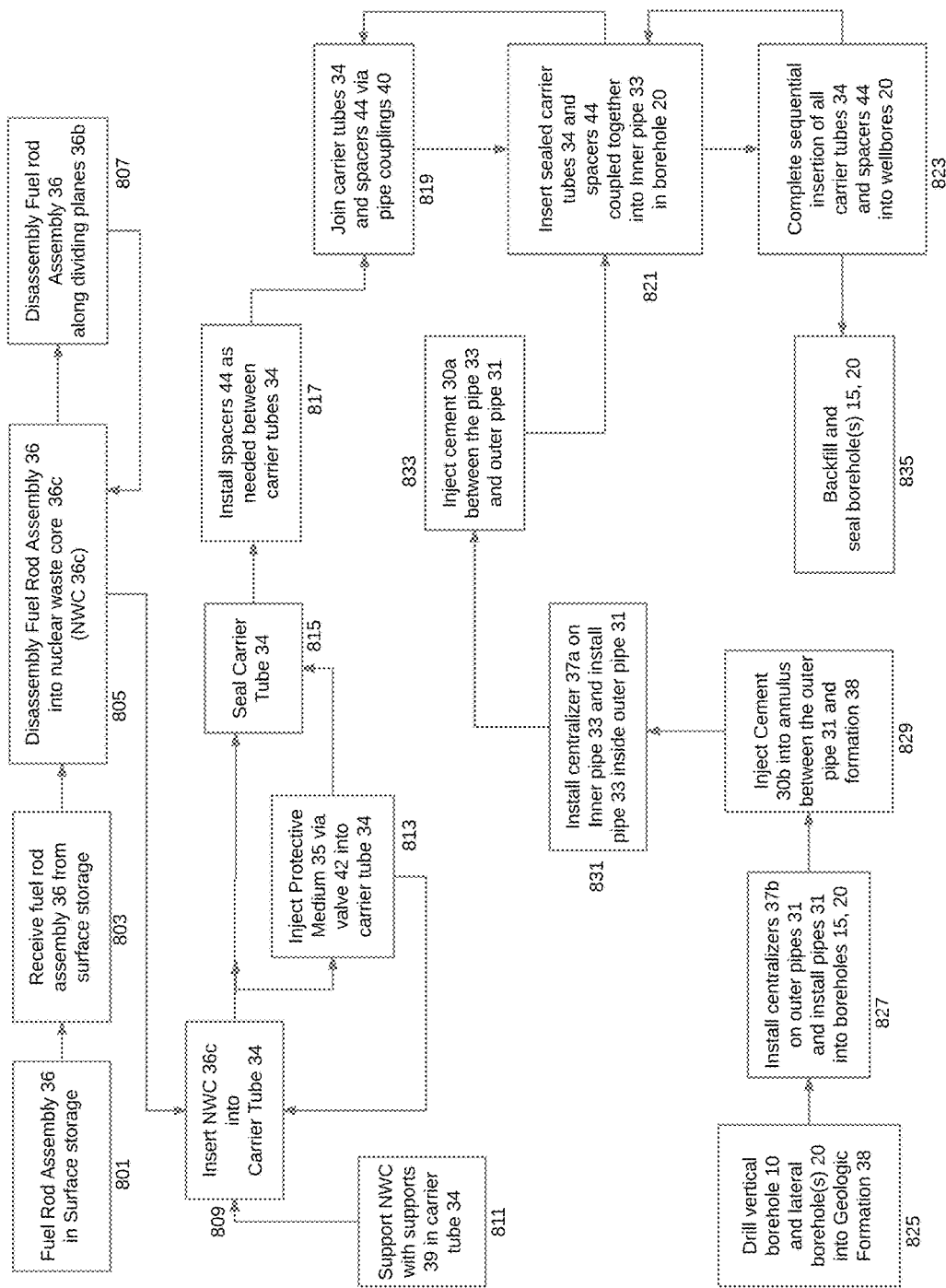
FIG. 8 may depict a method, with various steps, for handling nuclear waste, depicted as a flowchart.

FIG. 5 may illustrate an efficient operational sequence of tasks going from a complete fuel rod assembly 36 to a set of broken apart or otherwise separated fuel-rods-bundles 36a. FIG. 8 may illustrate a flow chart addressing such steps. In some embodiments, fuel rod assembly 36 may be disassembled by separating these subassembly elements of fuel-rods-bundles 36a at division-planes 36b as shown in steps 805 and 807 in FIG. 8. FIG. 5 may be a graphical depiction of steps 805 and 807 in FIG. 8. In some embodiments, a given fuel-rods-bundle 36a once separated from other fuel-rods-bundle 36a, may be known as a "nuclear-waste-core 36c." In some embodiments, nuclear-waste-core 36c or portions thereof may be located (e.g., placed) within a given waste-capsule 25. These steps 805 and 807 may be accomplished by robotic means (with or without shielding in some embodiments) with little or minimal radiation exposure problems to personnel. Steps 805 and 807 may avoid or mitigate potential problems of high cost, time, and human safety that occur if fuel rod assembly 36, which is relatively complex, were completely deconstructed into its constituent elements for pre-storage and disposal processing.

FIG. 6A, FIG. 6B, FIG. 6C, FIG. 6D, FIG. 6E, and FIG. 6F depict various aspects of various embodiments of the present invention.

Figure 6A:
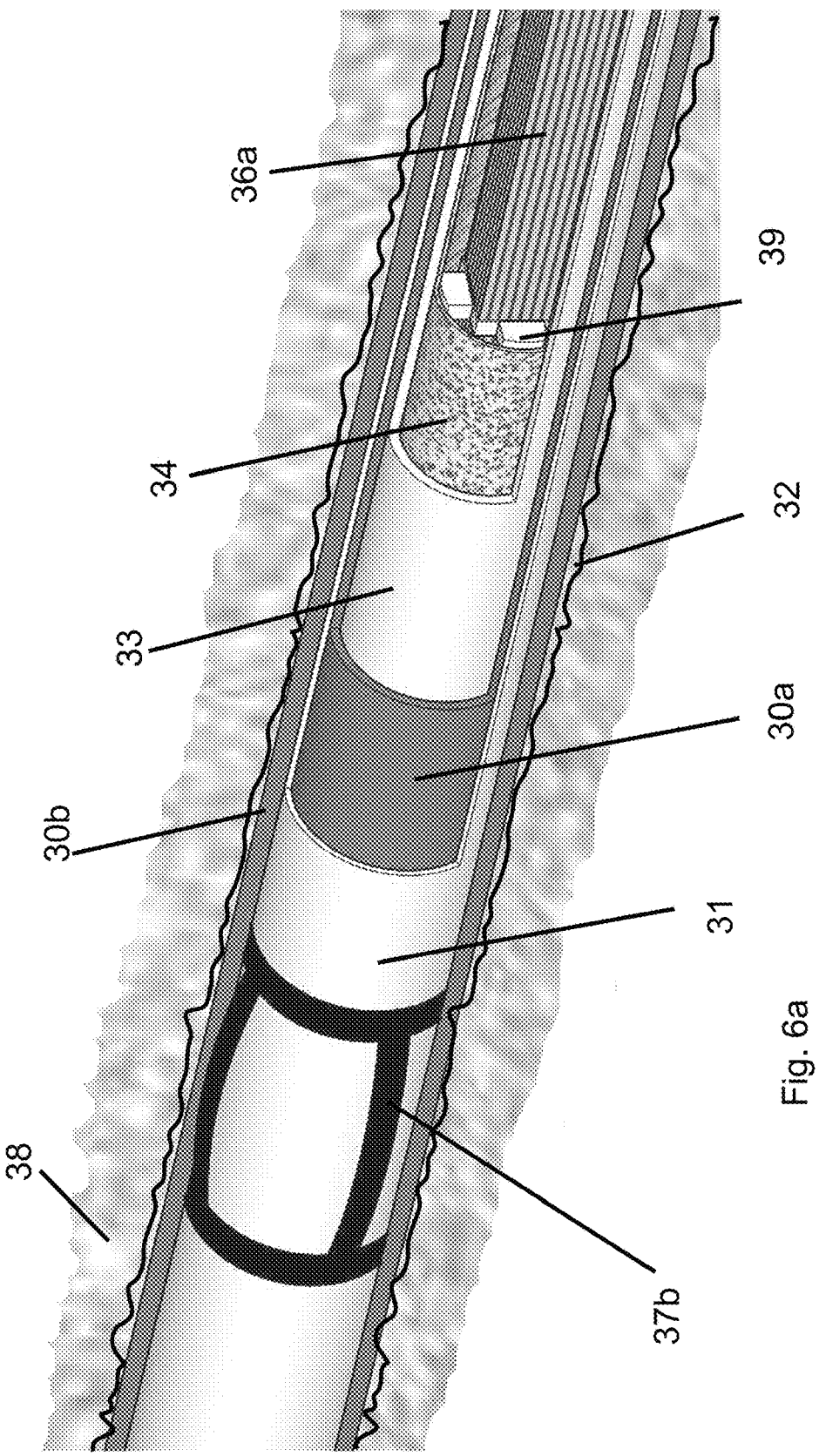
FIG. 6A is a partial cutaway view of the nuclear waste capsule system in-ground showing the concentric tubular elements.

In FIG. 6A a location of carrier tube 34 (waste-capsule 25) in deep-geological-formation 38 may show use of centralizer 37b. In some embodiments, centralizer 37b may allow outer pipe 31 to "standoff" from initial lateral borehole 32 within deep-geological-formation 38. In some embodiments, use of centralizer 37b around an outside portion of outer pipe 31 may then provide a substantially annual void space between outer surfaces of outer pipe 31 and surfaces of initial lateral borehole 32; which may then be substantially filled with cement 30b. In some embodiments, cement 30b may be injected as slurry into this substantially annular void space. In some embodiments, initial lateral borehole 32 may be a portion of primary lateral wellbore 20, secondary lateral wellbore 20a, and/or vertical-wellbore 15. In some embodiments, initial lateral borehole 32 may be formed from drilling hardware of drilling-rig 10. In some embodiments, outer pipe 31 may be a structural member. In some embodiments, outer pipe 31 may have a pre-determined length and a predetermined diameter. In some embodiments, outer pipe 31 may be an elongate member; that may be substantially hollow. In some embodiments, outer pipe 31 may be a cylindrical member. In some embodiments, outer pipe 31 may be substantially rigid to semi-rigid. In some embodiments, outer pipe 31 may be substantially constructed from one or more of: a steel, steel like alloy, stainless steel, copper, aluminum, zircalloy, combinations thereof, and/or the like. In some embodiments, outer pipe 31 may be described as at least one layer of pipe.

Figure 6B:
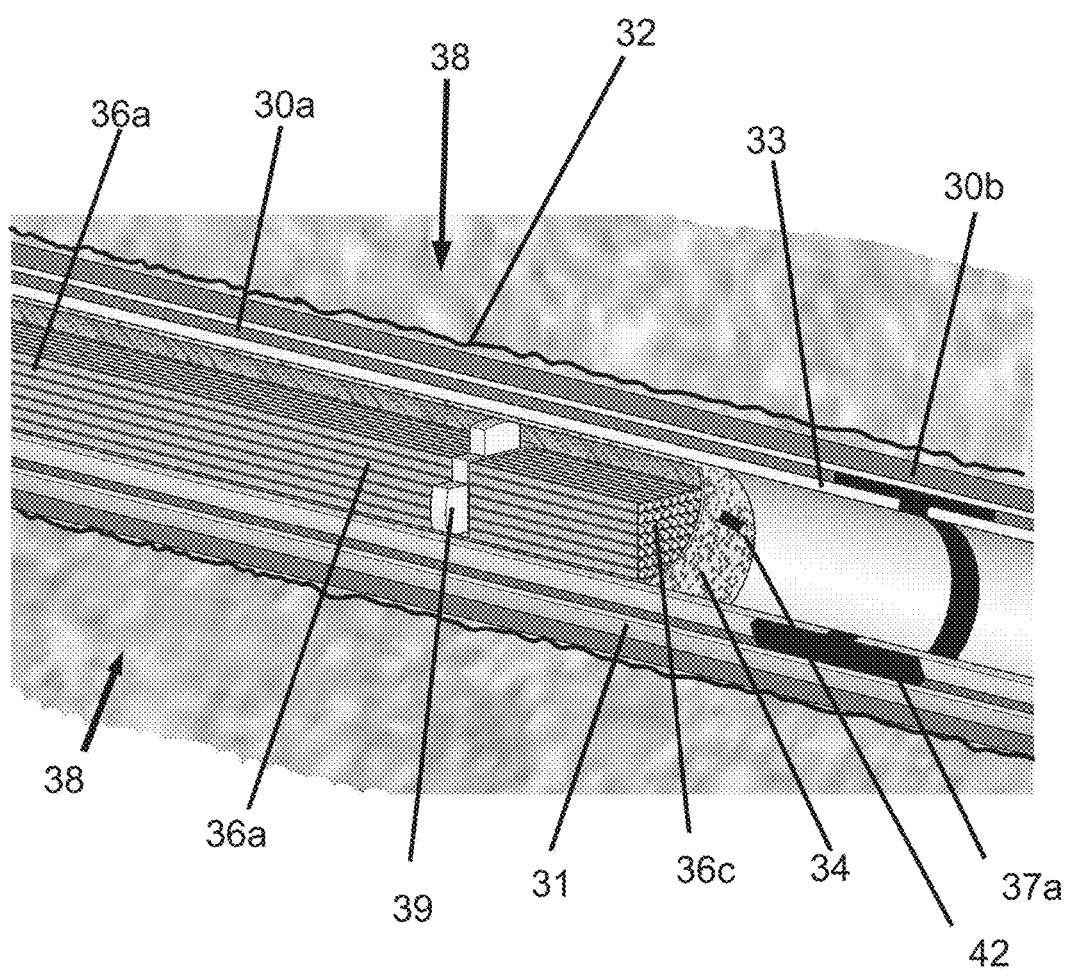
FIG. 6B is a cutaway view of the nuclear waste capsule system in-ground showing a close-up of the nuclear waste core and its supports.

FIG. 6B may show nuclear waste core 36c or portions thereof housed within carrier tube 34. In some embodiments, within carrier tube 34 may be nuclear waste core 36c or portions thereof. In some embodiments, carrier tube 34 may comprise one or more supports 39. In some embodiments, a given support 39 may be a structural member. In some embodiments, use of one or more supports 39 within carrier tube 34 may aid in positioning and/or locating nuclear waste core 36c or portions thereof within carrier tube 34. In some embodiments, nuclear waste core 36c may be suspended internally (e.g., coaxially) within carrier tube 34 by supports 39.

Figure 6C:
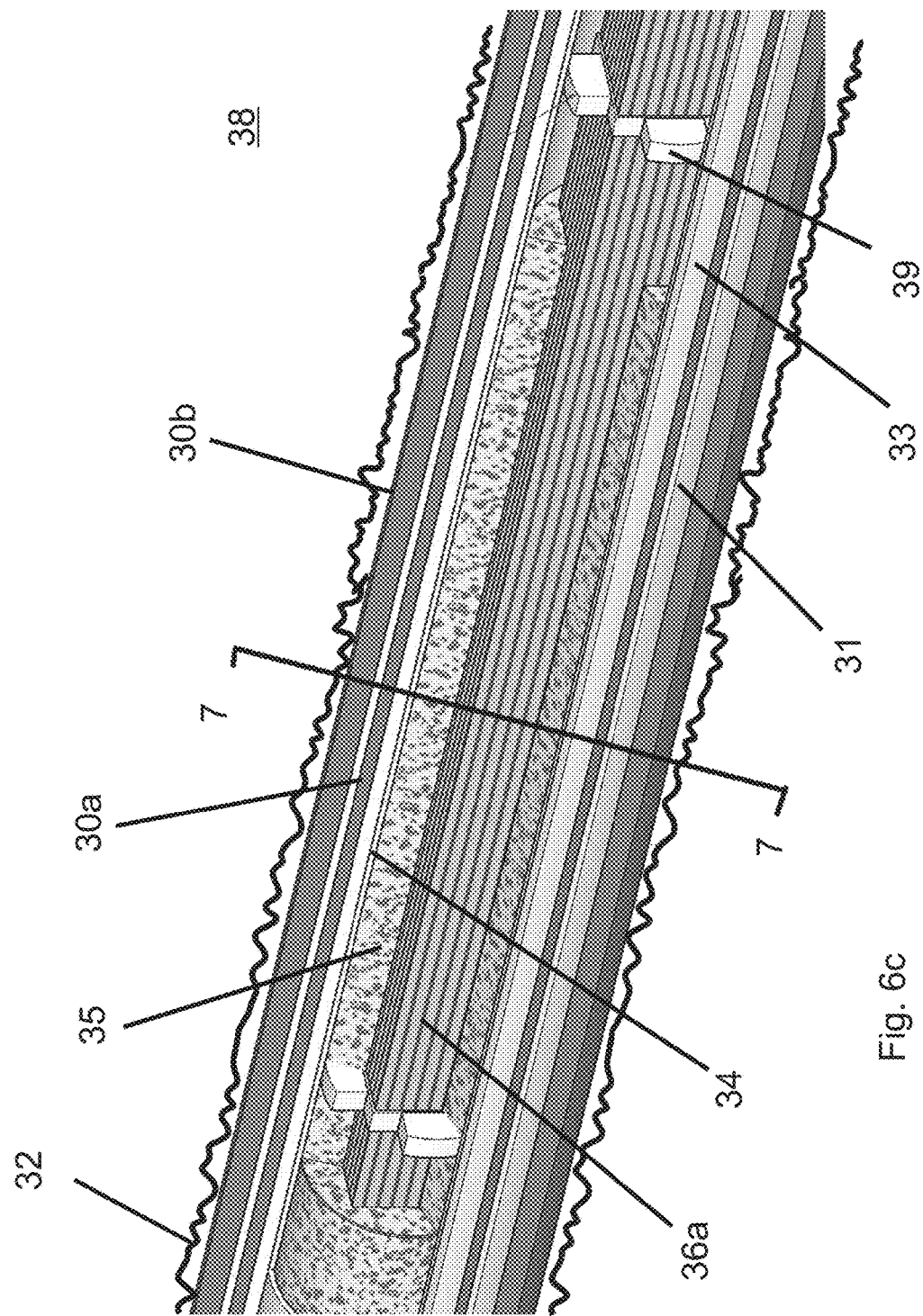
FIG. 6C is an enlarged cutaway sectional view of the nuclear waste capsule system showing a close-up of the protective medium surrounding the nuclear waste core.

FIG. 6C may depict protective-medium 35 located substantially around nuclear waste core 36c or substantially around portions thereof. In some embodiments, carrier tube 34 may comprise one or more valves 42. In some embodiments, valve 42 may permit access into internal volumes of carrier tube 34. In some embodiments, valve 42 may permit protective-medium 35 to be injected (e.g., pumped) into internal void volumes of carrier tube 34; in which case valve 42 may be characterized as an injector valve or as an injector port. In some embodiments, valve 42 may be a relief valve or an overflow port and may permit excess protective-medium 35 to exit carrier tube 34. In some embodiments, protective-medium 35 may substantially occupy internal volumes of carrier tube 34 that would otherwise be void space. In some embodiments, protective-medium 35 may help to seal nuclear waste core 36c (e.g., SNF and/or HLW) within carrier tube 34. In some embodiments, protective-medium 35 may help to waterproof carrier tube 34. In some embodiments, due to densities of protective-medium 35, protective-medium 35 may help to absorb radioactive emissions of nuclear waste core 36c. In some embodiments, due to heat capacities of protective-medium 35, protective-medium 35 may help to absorb heat emissions from nuclear waste core 36c. In some embodiments, protective-medium 35 may be substantially constructed from one or more: hydrocarbons, petroleum derivatives, high temperature hydrocarbon derived products, tar, bitumen, heavy crude oil, bentonite clay suspensions, oils, slurries, combinations thereof, and/or the like.

Figure 7:
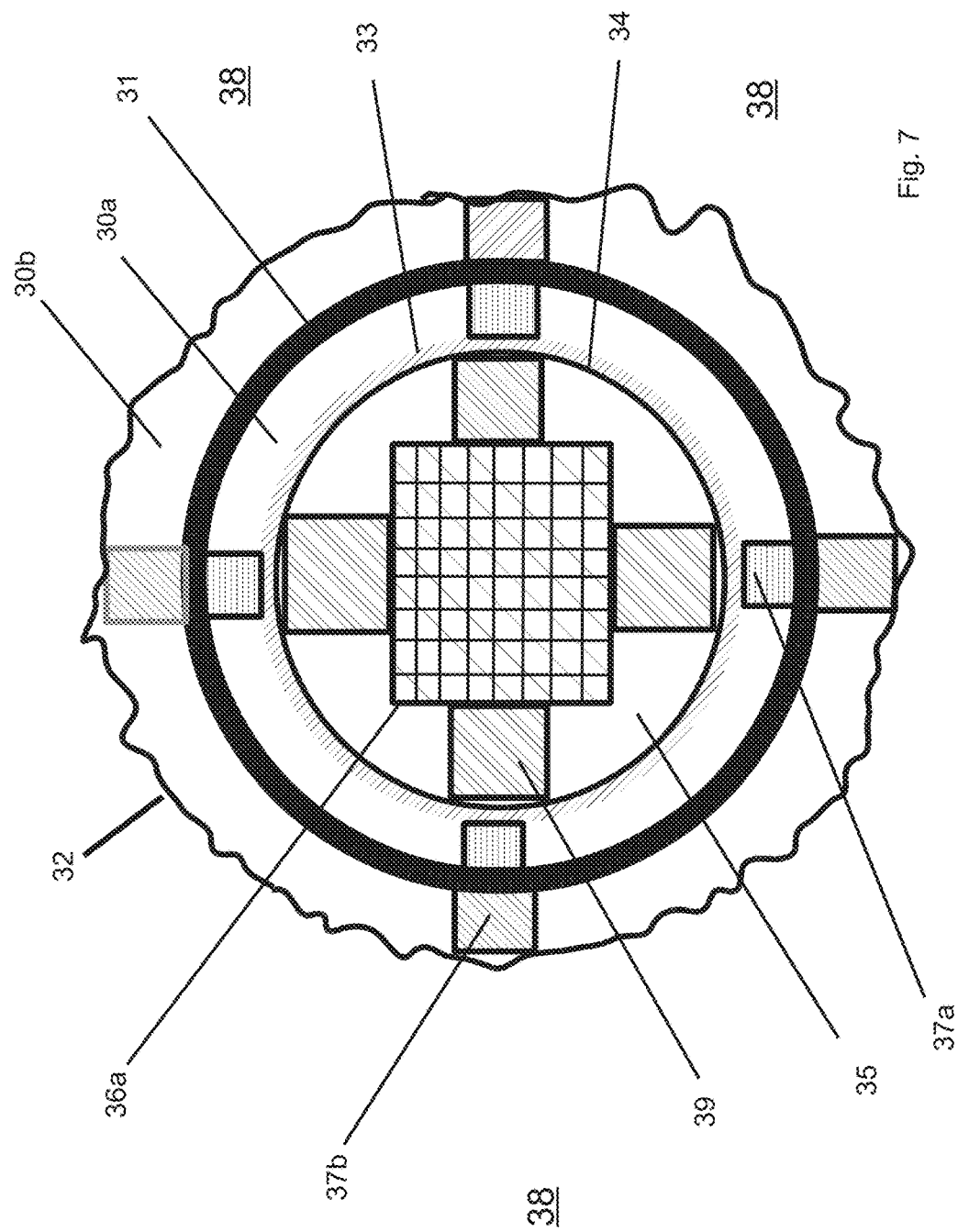
FIG. 7 may depict a transverse cross-sectional view through a section of an initial lateral borehole; wherein this cross-section is made at sectional-line 7-7 shown in FIG. 6C.

FIG. 6C may also depict transverse sectional-line 7-7. FIG. 7 may depict the transverse cross-sectional view derived from sectional-line 7-7 shown in FIG. 6C.

Figure 6D:
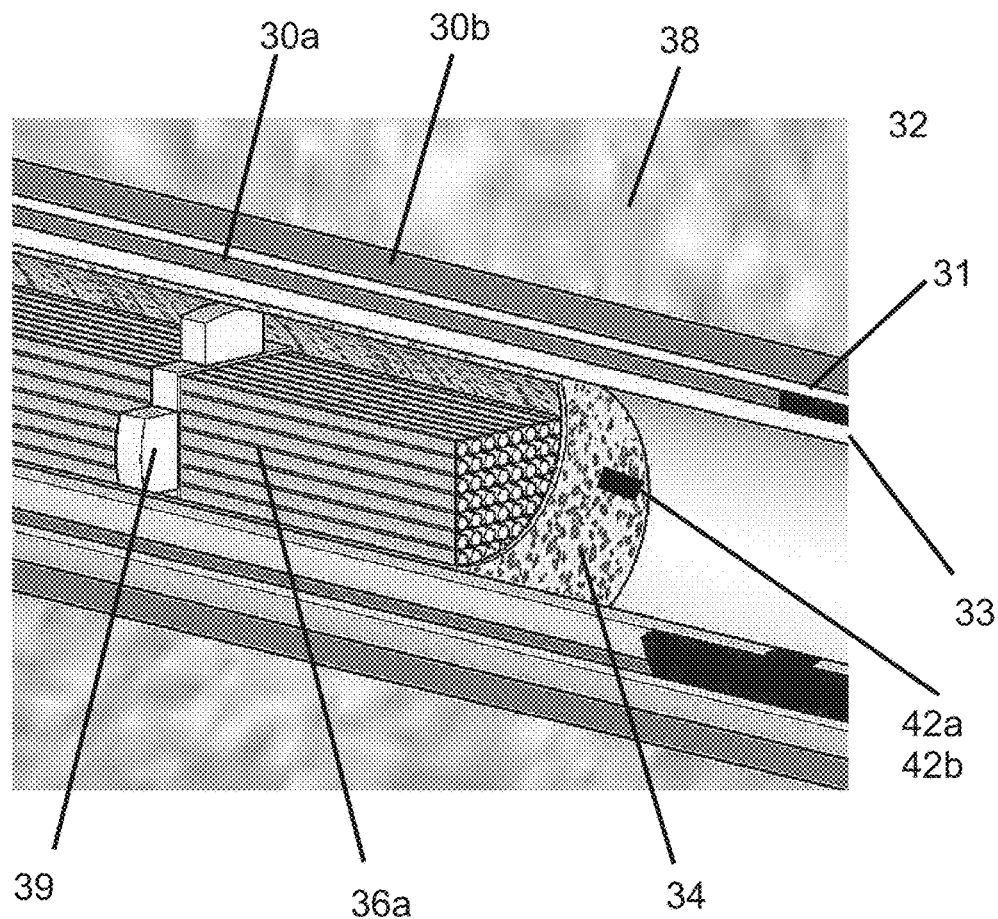
FIG. 6D is a partial cutaway view of an end of the carrier tube inside the nuclear waste capsule system showing the implementation of a port for transfer of the protective medium.

FIG. 6D may show valve 42 located on a terminal end of carrier tube 34. In some embodiments, a given carrier tube 34 (or a given waste-capsule 25) may have two opposing terminal ends (see e.g., FIG. 3). In some embodiments, at each such opposing terminal end of a given carrier tube 34 (or a given waste-capsule 25) may be one or more valves 42. In some embodiments, a valve 42 at one such terminal end may be for injection; while a valve 42 disposed oppositely at the other terminal end may be for relief. While FIG. 6D may show one such terminal end, the other opposing terminal end may be substantially a mirror image of FIG. 6D.

Figure 6E:
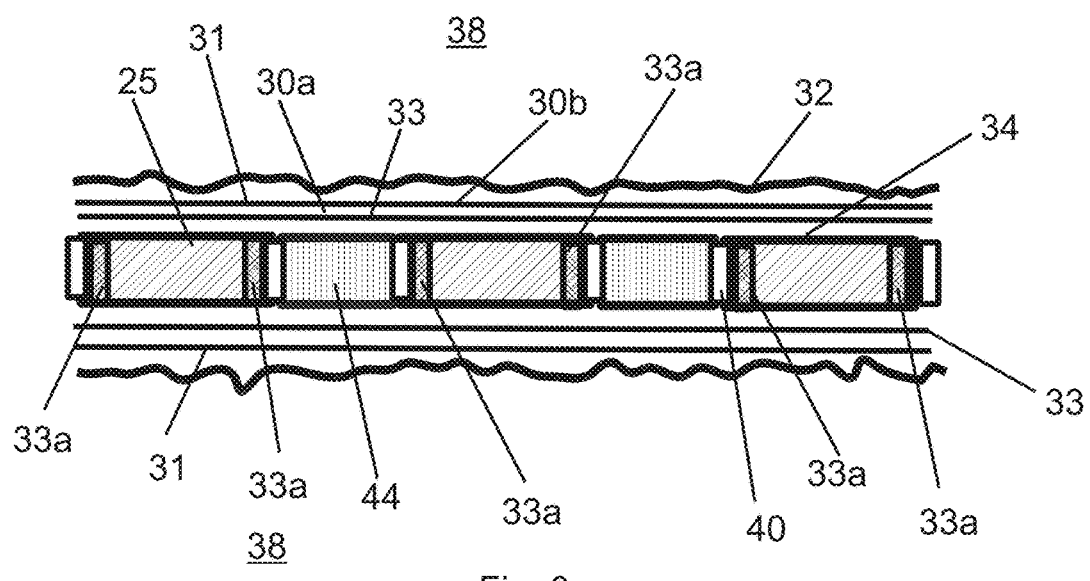
FIG. 6E is a diagram showing a portion of a waste-string of waste-capsules with non-waste bearing spacers installed to control heat load.

FIG. 6E may be longitudinal cross-sectional schematic view, similar to FIG. 6A. In some embodiments, for example, as shown in FIG. 6E, mechanical plugs 33a may be inserted into inner pipe 33 at each end of inner pipe 33 to hold a given inserted carrier tube 34 in place within inner pipe 33. In some embodiments, inner pipe 33 may be located within outer pipe 31. In some embodiments, inner pipe 33 and outer pipe 31 may be substantially coaxial with respect to each other. In some embodiments, inner pipe 33 and outer pipe 31 may be constructed from the same or similar types of materials. In some embodiments, inner pipe 33 may have a pre-determined length and a predetermined diameter. In some embodiments, inner pipe 33 may be a tube, tubular, and/or a casing. In some embodiments, inner pipe 33 may be a structural member. In some embodiments, inner pipe 33 may be an elongate member; that may be substantially hollow. In some embodiments, inner pipe 33 may be a cylindrical member. In some embodiments, inner pipe 33 may be substantially rigid to semi-rigid. In some embodiments, inner pipe 33 may be described as at least one layer of pipe. In some embodiments, the at least one layer of pipe may comprise outer pipe 31 and inner pipe 33.

Continuing discussing FIG. 6E, in some embodiments, one or more non-waste-bearing-spacers 44 may be disposed between waste-capsules 25, within a given run of inner pipe 33 or within a given run of initial lateral borehole 32. In some embodiments, a given non-wastebearing-spacer 44 may comprise two opposing terminal ends. In some embodiments, a given non-waste-bearing-spacer 44 may be an elongate member. In some embodiments, a given nonwaste-bearing-spacer 44 may be a substantially cylindrical member. In some embodiments, a given non-waste-bearing-spacer 44 may be rigid to semi-rigid. In some embodiments, a given non-waste-bearing-spacer 44 may be a structural member. In some embodiments, a given nonwaste-bearing-spacer 44 may function as a heat sink. In some embodiments, a given non-wastebearing-spacer 44 may be substantially or partially constructed from one or metals, such as steel, aluminum, alloys thereof, and/or the like. In some embodiments, one or more non-waste-bearing-spacer 44 disposed between waste-capsules 25, along with these waste-capsules 25 may form a waste-string. In some embodiments, a given waste-capsule 25 may be attached to a given non-waste-bearing-spacer 44, e.g., at mating (or at abutting) respective terminal ends. In some embodiments, a nature of this attachment may be removable. In some embodiments, a given non-waste-bearing-spacer 44 may be attached to another given non-waste-bearing-spacer 44, e.g., at mating (or at abutting) respective terminal ends. In some embodiments, a nature of this attachment may be removable. Calculations of a heat load generated by degrading of radioactive waste in the waste-capsules 25 may be made to determine a quantity, length, and/or materials of non-waste-bearing-spacer 44 needed to keep this heat flux within predetermined limits. Such calculations may provide limits to quantity, length, and/or materials of installed non-waste-bearing-spacer(s) 44 in the waste-string that also may include at least one waste-capsule 25.

Figure 6F:
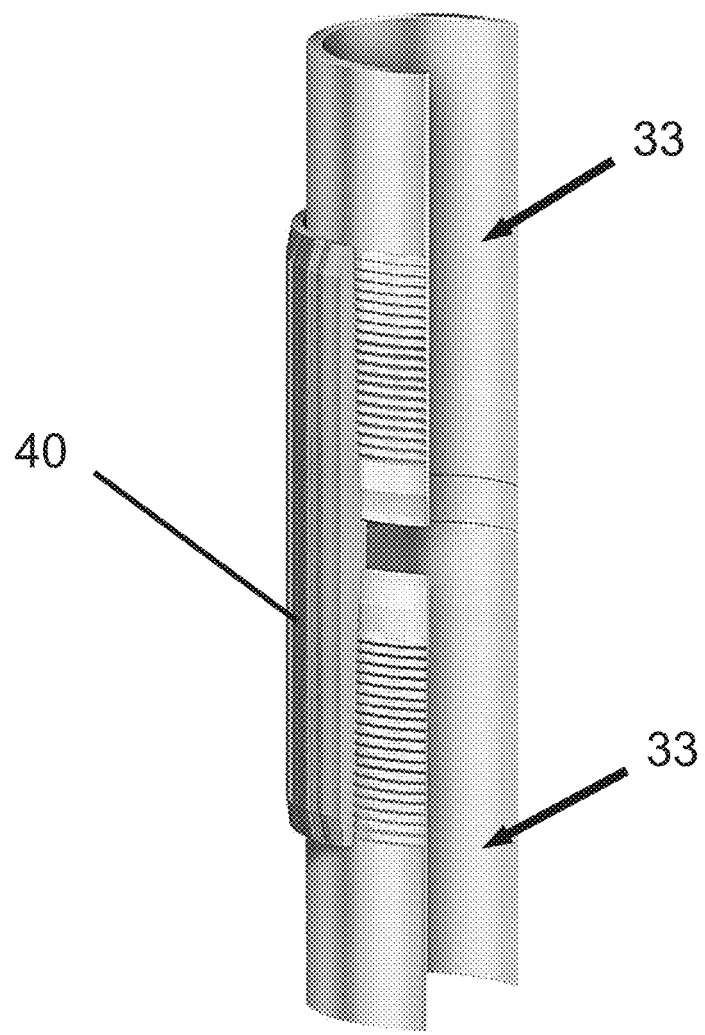
FIG. 6F may depict a pipe-coupling which may be used to link to proximate inner pipes to each other, in some embodiments, as shown by a perspective cross-sectional view.

FIG. 6F may depict pipe-coupling 40 which may be used to link to proximate inner pipes 33 to each other, in some embodiments. In some embodiments, pipe-coupling 40 may be a hollow cylindrical sleeve, with inner threading. In some embodiments, ends of inner pipes 33 may have outer threading, which may be complimentary with the inner threading of pipe-coupling 40. In some embodiments, pipe-coupling 40 may comprise a movable or articulable joint. In some embodiments, pipe-coupling 40 may be flexible.

FIG. 7 may depict a transverse cross-sectional view through a section of initial lateral borehole 32; wherein this cross-section is made at sectional-line 7-7 shown in FIG. 6C. FIG. 7 may show innermost nuclear waste core 36c. In some embodiments, nuclear waste core 36c may be a fuel-rods-bundle 36a of still intact nuclear fuel rods (or portions thereof) disassembled from fuel rod assembly 36. In some embodiments, attached externally (or in physical contact with) to nuclear waste core 36c, at predetermined locations, may be supports 39. See also, FIG. 6A, FIG. 6B, FIG. 6C, and FIG. 6D. Continuing discussing FIG. 7, in some embodiments, implemented along rectilinear faces of nuclear waste core 36c at these predetermined locations may be supports 39, which may support nuclear waste core 36c inside carrier tube 34. In some embodiments, disposed around supports 39 and around nuclear waste core 36c and within carrier tube 34 may be void space; wherein this void space may be substantially occupied by protective-medium 35. In some embodiments, carrier tube 34 may be a first concentric layer radially outward from nuclear waste core 36c and which may completely surround nuclear waste core 36c, including surrounding nuclear waste core 36c at its terminal ends. In some embodiments, carrier tube 34 may be a structural member. In some embodiments, carrier tube 34 may be an elongate member. In some embodiments, carrier tube 34 may be a substantially cylindrical member. In some embodiments, carrier tube 34 may be a substantially rigid to substantially semi-rigid. In some embodiments, carrier tube 34 may house SNF and/or HLW, such as nuclear waste core 36c. In some embodiments, carrier tube 34 may be a substantially constructed from and/or have a layer substantially constructive from corrosive resistant materials; wherein such materials may be resistive to radiation and/or heat. In some embodiments, carrier tube 34 may be substantially constructed of a metal or a metallic alloy which may be characterized by both its strength and its corrosion resistance. In some embodiments, carrier tube 34 may be substantially constructed of one or more of: steel, stainless steel, aluminum, cooper, zircalloy, combinations thereof, and/or the like. In some embodiments, carrier tube 34 may be at least ½ (0.5) inch in wall thickness. In some embodiments, directly adjacent and juxtaposed externally to carrier tube 34 may be inner pipe 33. In some embodiments, inner pipe 33 may provide both external support and increased strength to carrier tube 34 which carries nuclear waste core 36c. In some embodiments, a wall thickness of inner pipe 33 may be at least ½ (0.5) inch. In some embodiments, inner pipe 33 may be substantially constructed of a steel, metal, and/or alloy, with yield strength in excess of 75,000 psi. In some embodiments, such a steel type may be at least N-80 grade and or P-110 grade or better. In some embodiments, use of inner pipe 33 may provide additional engineering barriers to protect SNF and/or HLW while buried according to one or more embodiments of the present invention.

Continuing discussing FIG. 7, in some embodiments, disposed on an external surface of inner pipe 33 may be centralizers 37a. In some embodiments, such centralizers 37a may be spaced substantially orthogonally around external surfaces of inner pipe 33. In some embodiments, such centralizers 37a may keep inner pipe 33 at a "standoff" distance (predetermined distance) from outer pipe 31. In some embodiments, external and concentric to inner pipe 33 may outer pipe 31 of larger diameter than inner pipe 33. In some embodiments, use of centralizers 37a may form a substantially uniform annulus between outer pipe 31 and inner pipe 33. In some embodiments, this annulus (e.g., ring structure) may be substantially filled with cement 30a. In some embodiments, such positioned cement 30a may provide external support as well as an engineered barrier for the internal elements of waste-capsule 25 (i.e., of carrier tube 34).

Continuing discussing FIG. 7, in some embodiments, disposed on an external surface of outer pipe 31 may be centralizers 37b. In some embodiments, such centralizers 37b may be spaced substantially orthogonally around external surfaces of outer pipe 31. In some embodiments, such centralizers 37b may keep outer pipe 31 at a "standoff" distance (predetermined distance) from initial lateral borehole 32. In some embodiments, use of centralizers 37b may form another substantially uniform annulus between initial lateral borehole 32 and outer pipe 31. In some embodiments, this annulus may be substantially filled with cement 30b. In some embodiments, such positioned cement 30b may provide external support as well as an engineered barrier for the internal elements of waste-capsule 25 (i.e., of carrier tube 34).

FIG. 8 may depict a flowchart. FIG. 8 may depict various steps of method 800. In some embodiments, method 800 may be a method for handling nuclear waste. In some embodiments, method 800 may be a method for processing fuel rod assemblies 36 into nuclear waste cores 36c, for subsequent subterranean storage in deep-geological-formations 38, according to one or more embodiments of the present invention. In some embodiments, method 800 may be a method for subterranean storage of nuclear waste in deep-geological-formations 38.

In some embodiments, method 800 may comprise one or more of: status 801, step 803, step 805, step, 807, step 809, step 811, step 813, step 815, step 817, step 819, step 821, step 823, step 825, step 827, step 829, step 831, step 833, and/or step 825. In some embodiments, status 801; and/or steps 803 through step 819 may occur away from subterranean storage location site; i.e., away from below where deep-geological-formation 38 may be located. In some embodiments steps 821 through step 835 may occur at or below the subterranean storage location site.

Continuing discussing FIG. 8, in some embodiments, status 801 may be a status of when fuel rod assemblies 36 may be stored at the surface, such as in storage pools. For example, nuclear waste from the nuclear power plants 10a may be stored at status 801 for long term cooling for periods of several years, such as, between four and 30 years, or for up to 30 years or more in other embodiments. Such surface storage may be initially done in cooling pools; sometimes then later in casks or other massive protected containers on or near the surface.

In some embodiments, step 803 may be step of receiving fuel rod assemblies 36 from that surface storage (e.g., from cooling pools or casks). That is, in some embodiments, the receiving step 803 may be a harvesting step, as in a step of harvesting fuel rod assemblies 36 from the surface storage. In some embodiments, step 803 may transition in step 805.

Continuing discussing FIG. 8, in some embodiments, step 805 may be a step of disassembling fuel rod assemblies 36 into resulting sub-assemblies, for example, of nuclear waste cores 36c. In FIG. 8, "NWC" may stand for one or more nuclear waste cores 36c. In some embodiments, step 807 may be a step of disassembling fuel rod assemblies 36 into resulting nuclear waste cores 36c by using dividing-planes 36b. That is, step 807 may be a sub-step of step 805. As noted earlier, steps 805 and/or step 807, may be automated and performed by robotics, to increase safety to personnel. Such automation may be shielded (radiation shielding) in some embodiments. Such disassembly may be mechanical disassembly and separation. Resulting nuclear waste cores 36c from steps 805 and step 807 may be in rectangular prism form (i.e., in square matrix form). See also FIG. 4 and FIG. 5 and their corresponding discussion above.

Continuing discussing FIG. 8, in some embodiments, step 805 may transition into step 809. In some embodiments, step 809 may be a step of inserting nuclear waste cores 36c into carrier tube(s) 34. In some embodiments, step 809 may include sub-step 811. In some embodiments, sub-step 811 may be optional. In some embodiments, sub-step 811 may be a step of supporting nuclear waste cores 36c within carrier tube(s) 34 with support(s) 39. In some embodiments, use of support(s) 39, may facilitate use of protective-medium 35 as noted above. See also, FIG. 6A, FIG. 6B, FIG. 6C, FIG. 6D, and FIG. 7; as well as their corresponding discussions above.

Continuing discussing FIG. 8, in some embodiments, step 813 may be a step of injecting protective-medium 35 into carrier tube(s) 34, e.g., via use of valve 42, as noted above. In some embodiments, carrier tube(s) 34 may be pre-loaded with protective-medium 35, prior to insertion of nuclear waste cores 36c into the given carrier tube 34 via step 809. That is in some embodiments, step 813 may precede step 809. In such embodiments, insertion of nuclear waste cores 36c into carrier tube 34, may then force excess protective-medium out of that given carrier tube 34, e.g., via valve 42 (e.g., as a relief valve). And then step 809 may progress into step 815. That is, in such embodiments, step 813 may progress into step 809, which may then progress to step 815. Step 809 may still also follow step 805.

Whereas, in other embodiments, step 805 may progress to step 809, which may progress to step 813, which may progress to step 815. See FIG. 8.

Continuing discussing FIG. 8, in some embodiments, step 815 may be a step of sealing a given carrier tube 34 that may comprise nuclear waste cores 36c. In some embodiments, step 815 may involve sealing terminal ends of the given carrier tube 34 via welding. In some embodiments, step 815 may involve sealing terminal ends of the given carrier tube 34 with mechanical plug(s) 33a. See e.g., FIG. 6E and its discussion above.

Continuing discussing FIG. 8, in some embodiments, step 815 may progress into step 817. In some embodiments, step 817 may be a step of installing spacers 44, as needed for heat management, between the now sealed carrier tube(s) 34 (with nuclear waste cores 36c). See e.g., FIG. 6E and its above discussion. In such a manner a given waste-string may be formed. In some embodiments, a waste-string may comprise at least two carrier tubes 34 separated and attached to a common spacer 44. In some embodiments, step 817 may be optional. In some embodiments, where step 817 may be omitted, then step 815 may progress to step 819 or to step 821.

Continuing discussing FIG. 8, in some embodiments, step 817 may then progress into step 819. In some embodiments, step 819 may be optional or used as desired or used as necessary. In some embodiments, step 819 may be a step of joining carrier tubes 34 together via use of pipe-coupling(s) 40. In some embodiments, such carrier tubes 34 may already be linked (e.g., attached to each other) via spacers 44, per step 817 as noted above. In some embodiments, step 819 may then progress into step 821.

Continuing discussing FIG. 8, in some embodiments, step 821 may be a step of inserting the sealed carrier tubes 34 into inner pipes 33; and subsequently placing such inner pipes 33 into drilled boreholes. In some embodiments, step 815 may progress directly to step 821 (e.g., when spacers 44 and pipe-couplings 40 may not be used). In some embodiments, step 817 may progress directly to step 821 (e.g., when pipe-couplings 40 may not be used). In some embodiments, when step 819 progresses into step 821, then the sealed carrier tubes 34 that may be inserted into inner pipe(s) 33 may include use of spacers 44 and/or use of pipe-couplings 40. In some embodiments, step 821 may include use of mechanical plugs 33a in inner pipes 33 at terminal ends of carrier tube(s) 34 also within that given inner pipe 33. Use of such mechanical plugs 33a may minimize unintended shifting of the inserted carrier tube(s) 34 within inner pipe(s) 33; e.g., during transportation of such loaded inner tube(s) 33 or during loading of the loaded inner pipe(s) 33. In some embodiments, as shown in FIG. 8, step 821 may also loop back onto step 819; e.g., when inner pipes 33 may need to be joined via pipe-couplings 40.

Continuing discussing FIG. 8, in some embodiments, one or more of step 825, step 827, step 829, step 831, and/or step 833 may progress and lead to step 821. In some embodiments, step 825 may be a step of drilling the given borehole(s) by use of drilling-rig 10. In some embodiments, step 825 may yield one or more of: vertical-wellbore 15, primary lateral wellbore 20, secondary lateral wellbore 20a, and/or initial lateral borehole 32. In some embodiments, step 825 may result in one or more wellbores being drilled into deep-geological-formation 38.

Continuing discussing FIG. 8, in some embodiments, step 825 may progress into step 827. In some embodiments, step 827 may be a step of loading outer pipes 31 into the resulting boreholes from step 825. In some embodiments, loading of these outer pipes 31 into the resulting boreholes may also entail fitting such outer pipes 31 with centralizers 37b.

Continuing discussing FIG. 8, in some embodiments, step 827 may progress into step 829. In some embodiments, step 829 may be an injecting cement step; such a cement casing (see e.g., cement 30b in FIG. 6A) may be substantially formed in an annulus around outer pipes 31 and within boreholes (e.g., one or more of vertical-wellbore 15, primary lateral wellbore 20, secondary lateral wellbore 20a, and/or initial lateral borehole 32) that may house such outer pipes 31. In some embodiments, during step 829, cement (while in un-cured slurry form) may be pumped into and within the outer pipes 31, and subsequently forced out of an open bottom end of outer pipes 31, wherein such pressure may then force this cement slurry into the noted annular space. In some embodiments, step 829 may be a step of circulation of cement. In some embodiments, after such injected (e.g., pumped) cement per step 829 has sufficiently cured, interior portions of outer pipes 31 may be cleaned of undesirable residual cement; e.g., via use of wiper plugs.

Continuing discussing FIG. 8, in some embodiments, step 829 may progress into step 831. In some embodiments, step 831 may be a step of loading inner pipes 33 into outer pipes 31. In some embodiments, loading of these inner pipes 33 into outer pipes 31 may also entail fitting such inner pipes 33 with centralizers 37a; such axis of inner pipes 33 may be substantially concentric (coaxial) with respect to axis of outer pipes 31.

Continuing discussing FIG. 8, in some embodiments, step 831 may progress into step 833. In some embodiments, step 833 may be an injecting cement step; such that a cement layer (see e.g., cement 30a in FIG. 6A) may be substantially formed in an annulus around inner pipes 33 and within outer pipes 31 that may house such inner pipes 33. In some embodiments, during step 833, cement (while in un-cured slurry form) may be pumped into and within the inner pipes 33, and subsequently forced out of an open bottom end of inner pipes 33, wherein such pressure may then force this cement slurry into the noted annular space between the exterior of inner pipes 33 and the interior of outer pipes 31. In some embodiments, step 833 may be a step of circulation of cement. In some embodiments, after such injected (e.g., pumped) cement per step 833, interior portions of inner pipes 33 may be cleaned of undesirable residual cement; e.g., via use of wiper plugs. In some embodiments, step 833 may then progress into step 821; wherein waste-strings may be installed (inserted) to the inner pipes 33.

Continuing discussing FIG. 8, in some embodiments, step 821 may progress into step 823. In some embodiments, step 823 may be a step of finishing inserting the sealed carrier tubes 34 into the inner pipes 33; wherein these inner pipes 33 may already be installed into the outer pipes 31. In some embodiments, step 823 may be a step of completing sequential insertion of all carrier tubes 34 into inner pipes 33. In some embodiments, such carrier tubes may be with spacers 44 per step 817. In some embodiments, step 823 may loop back onto step 821 depending on the total number of carrier tubes to be inserted.

Continuing discussing FIG. 8, in some embodiments, step 823 may progress into step 835. In some embodiments, step 835 may be a step of sealing the various boreholes. Various backfills, including, but not limited to cement pours, may be used for this purpose.

In some embodiments, retrieval of subterranean stored waste-capsule(s) 25 (and/or carrier tube(s) 34) stored according to method 800 may be straightforward. In some embodiments, such subterranean stored waste-capsule(s) 25 (and/or carrier tube(s) 34) may be retrieved using an "overshot" fishing tool (e.g., as used in oilfield operations) and returned sequentially to the surface in a routine operation. Then once on the surface, protective-medium 35 inside a given carrier tube 34 and surrounding the nuclear waste core 36c may be removed by an efficient dissolution process with the appropriate solvents; and thus making nuclear waste core 36c fully accessible, for various purposes, including research, investigation, observation, and/or available for re-processing, or relocation.

Systems and methods for deep geological storage of nuclear waste have been described. The foregoing description of the various embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for handling nuclear waste using a nuclear waste capsule system, the method comprising:
   (a) disassembling spent nuclear fuel assemblies into nuclear waste cores, wherein each nuclear waste core is a bundle of preexisting fuel rods disassembled from the spent nuclear fuel assemblies;
   (b) attaching at least one external support to each nuclear waste core;
   (c) inserting each nuclear waste core, with the at least one external support, into a carrier tube of pre-determined length and diameter, wherein the at least one external support suspends the nuclear waste core coaxially within the carrier tube;
   (d) filling a void space substantially around each nuclear waste core, with the at least one external support, and within the carrier tube, with a protective-medium through an injector port in communication with the carrier tube, wherein the protective-medium protects the nuclear waste capsule system from degradation by absorbing radioactive emissions and by absorbing heat emissions;

(e) sealing the carrier tube with mechanical plugs at terminal ends of the carrier tube;

(f) repeating steps (b) through (e) to form at least two different sealed carrier tubes;

(g) attaching the at least two different sealed carrier tubes to each other to form a waste-string;

(h) inserting the waste-string into a wellbore at a predetermined depth; and (i) sealing the wellbore.

2. The method according to claim 1, wherein the disassembling of the spent nuclear fuel assemblies uses safe robotic mechanical processes.

3. The method according to claim 1, wherein a given spent nuclear fuel assembly, selected from the spent nuclear fuel assemblies, is disassembled along at least one dividing-plane of the spent nuclear fuel assembly.

4. The method according to claim 1, wherein the carrier tube is constructed from one or more of the following, used singly or compositely in combination: steel, stainless steel, aluminum, cooper, or zircalloy.

5. The method according to claim 1, wherein the terminal ends of the carrier tube is two opposing ends, wherein the injector port is located on at least one such terminal end.

6. The method according to claim 5, wherein the carrier tube comprises an overflow port, wherein the overflow port is located on at least one of the two opposing terminal ends; wherein the overflow port permits excess of the protective-medium to drain from the carrier tube.

7. The method according to claim 1, wherein the protective-medium is selected from one or more of: high temperature hydrocarbon derived products, tar, bitumen, heavy crude oil, or bentonite clay suspensions.

8. The method according to claim 1, wherein the sealing of the carrier tube is by welding a given mechanical plug to its respective terminal end.

9. The method according to claim 1, wherein the wellbore of step (h) is lined with at least one layer of pipe; wherein it is this at least one layer of pipe that receives the waste-string.

10. The method according to claim 9, wherein the at least one layer of pipe is fitted with a plurality of centralizers at selected determined points externally to the at least one layer of pipe; such that an axis of this at least one layer of pipe is substantially concentric with an axis of the wellbore.

11. The method according to claim 9, wherein between an exterior of this at least one layer of pipe and an interior of the wellbore is a cement casing that is installed by pumping uncured cement slurring through an interior of this at least one layer of pipe and through a bottom of this at least one layer of pipe prior to inserting of the waste-string.

12. The method according to claim 9, wherein the at least one layer of pipe is formed from pre-determined lengths of pipe; wherein each these predetermined lengths of pipe are joined together via pipe-couplings.

13. The method according to claim 9, wherein the least one layer of pipe comprises an outer pipe and an inner pipe disposed within the outer pipe, such that the outer pipe and the inner pipe are substantially coaxial with respect to each other.

14. The method according to claim 13, wherein the waste-string is inserted into the inner pipe.

15. The method according to claim 13, wherein between an exterior of the inner pipe and an interior of the outer pipe is a cement layer that is installed by pumping uncured cement slurry through an interior of the inner pipe and through a bottom of the inner pipe prior to inserting of the waste-string into the inner pipe.

16. The method according to claim 1, wherein step (g) further comprises attaching the at least two different sealed carrier tubes to each other by use of at least one non-waste-bearing-spacer disposed between and attached to each of the at least two different sealed carrier tubes for controlling heat load dissemination from the nuclear waste cores.

17. The method according to claim 1, wherein the predetermined depth is at least 10,000 ft.

18. The method according to claim 1, wherein prior to step (a), the method comprises a step of harvesting the spent nuclear fuel assemblies from surface storage that then progresses into step (a).

* * * * *